United States Patent Office 3,303,692
Patented Feb. 14, 1967

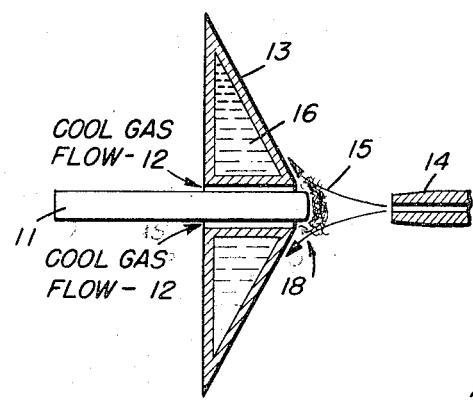
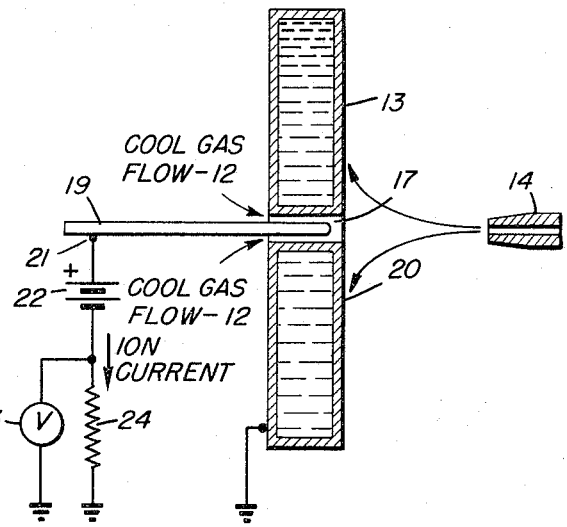
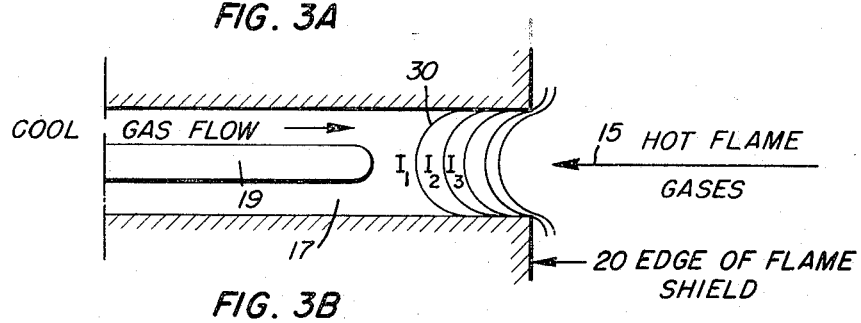
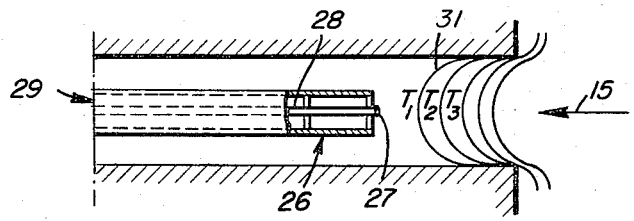
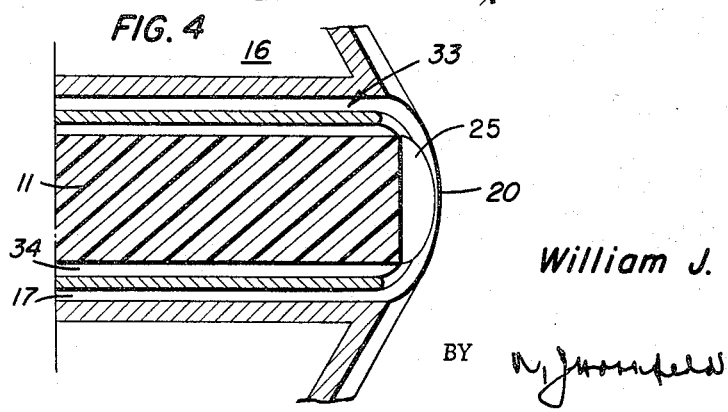
INVENTOR
William J. McLean

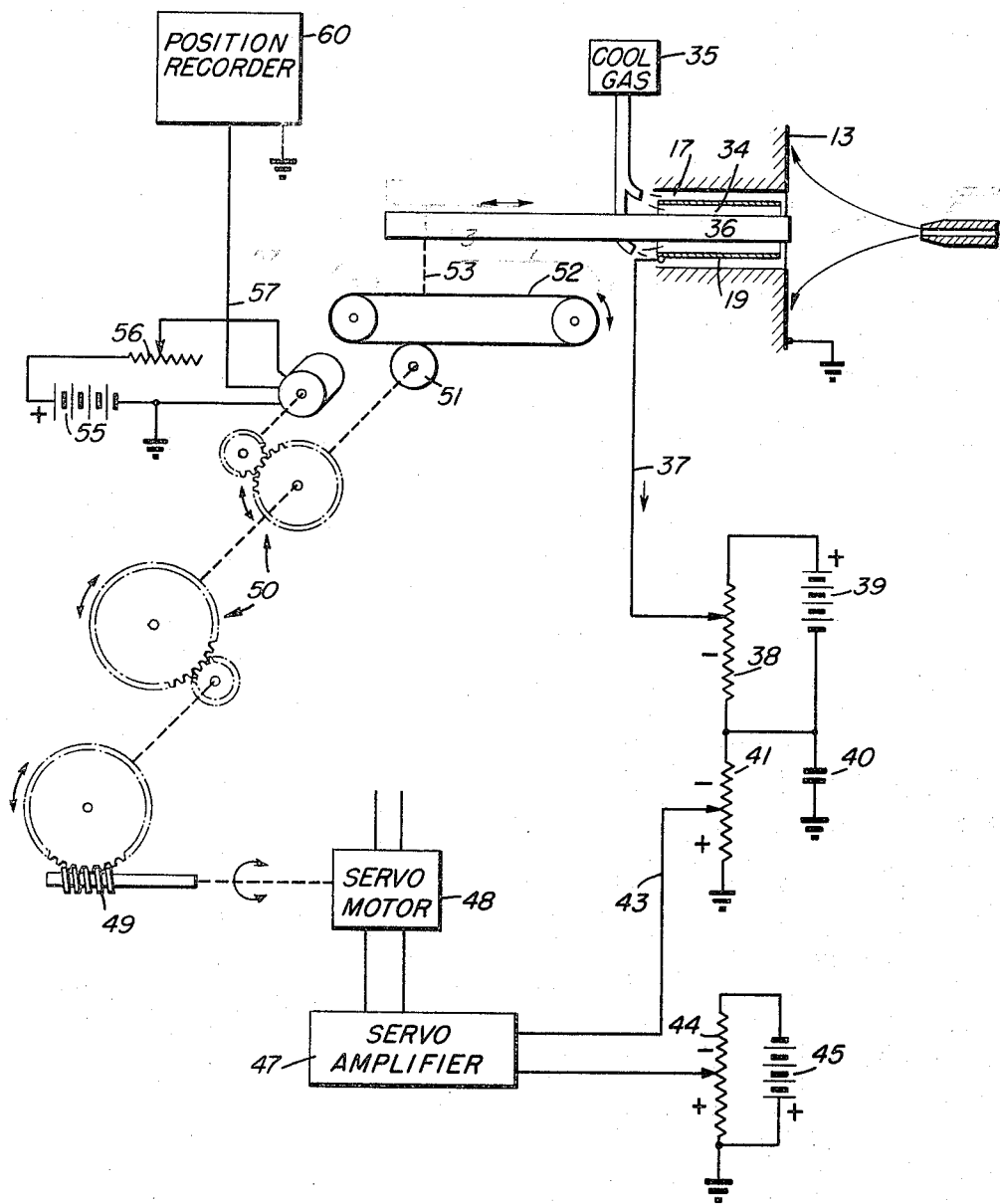

3,303,692
ABLATION RATE DETECTION SYSTEM
AND METHOD
William J. McLean, Berwyn Heights, Md., assignor to the United States of America as represented by the Secretary of the Navy
Filed Oct. 30, 1964, Ser. No. 407,934
10 Claims. (Cl. 73—86)

The invention described herein may be manufactured and used by or for the Government of the United States of America for governmental purposes without the payment of any royalties thereon or therefor.

The present invention relates to measuring and testing systems and more particularly to systems for detecting and measuring the ablation rate of test materials undergoing pyrolysis in hot flowing gases.

In testing and studying ablating materials, it has been the general practice when determining the ablation rate to manually move a rod of material under study into hot flame gases produced by an oxy-acetylene torch. The experimenter pushed one end of the rod through a cool flame shield gradually toward the flame at a rate which counterbalanced the rate of pyrolysis of the rod material, carefully allowing only the end of the rod to ablate in the flame. After a period of time, the consumed rod length was measured and the rate of rod advancement was recorded. By skillfully moving the rod into the hot gases at the same rate at which it was being consumed, the experimenter could record a rate which was very nearly the ablation rate. This method although theoretically feasible has not proved very satisfactory experimentally since considerable difficulty has been experienced in visualizing the end of the rod in the gases because of the obscuration produced by excessive light, vapor, and smoke. Also visual control of the rate at which the rod is pushed forward is hampered by the slowness with which some materials are consumed resulting in much uncertainty on the part of the experimenter. This uncertainty produces an unsteady motion of the rod and prevents accurate measurements.

With this invention it is possible to accurately measure the rate of ablating materials in hot flame gases by automatically sensing changes in the ablation rate and controlling the position of a rod of the test material so that it moves gradually and continuously toward the hot flame gases. The present invention contemplates establishing a unique stable boundary region near the ablating end of the rod of material which enables sensitive detection of changes in the ablation rate and then using the detected signals in a servo system for smooth automatic control of the rod position thus eliminating both the visualization and manual control problems.

Accordingly, it is an object of the present invention to provide a novel system for studying characteristics of materials in hot corrosive environments.

Another object is the provision of a new and improved system for accurately measuring the ablation rate of moving materials in hot flowing fluids.

It is still another object to provide a novel system for controlling the movement of a mass of burning material gradually and continuously toward its burning end at a rate exactly counterbalancing its burning rate.

A further object of this invention is the provision of a sensing system which is capable of detecting changes in ablation rate of materials being consumed in hot fluids where visualization of the material in the fluid is greatly hampered by adverse viewing conditions.

Another object of this invention is to provide a sensing system which detects movement of a stable boundary region formed by the meeting of a hot ionized gas and a cool inert gas.

A still further object is to provide a stable boundary detection region near the ablating end of a test material being steadily moved into a hot flowing gas with which changes in ablation rate are readily and automatically detected.

Yet another object of the present invention is to provide a measuring and testing system for measuring the ablation rate of steadily moving materials in hot flowing fluids in which spurious changes in the ablation rate are automatically sensed, in which movement of the material toward a hot fluid source is automatically kept gradual and continuous at a rate exactly counterbalancing the ablation rate, and in which accurate measurements of the ablation rate are recorded.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a cross-section view of part of the basic test apparatus;

FIG. 2 illustrates a schematic of an error sensing apparatus partly in cross-section;

FIG. 3A is an enlarged view of a portion of FIG. 2 illustrating regions of constant ion density;

FIG. 3B illustrates another embodiment of the sensing apparatus of FIGURES 2 and 3A showing regions of constant temperature;

FIG. 4 is an enlarged cross-sectioned view of the test apparatus in perspective; and FIG. 5 shows a schematic diagram of a preferred automatic control system.

Referring now to the drawings, the apparatus of FIG. 1 includes a cylindrical rod 11 composed of ablating material, a flame shield 13 filled with a coolant such as water, and an oxy-acetylene torch 14. The rod 11 may be composed of any suitable ablating material such as plastic, silicaplastic composite, or the like, so long as it will ablate at high temperatures, typically on the order of 3000° C. As the rod is pushed through annulus 17 toward flame 15, the rod will ablate or burn away at a slow rate. The purpose of the flame shield 13 is to prevent the flame or hot gases from swirling around rod 11 and consuming more of the rod 11 than just the rod end 25. This is a desirable feature since one-dimensional heating greatly simplifies mathematical expressions used later in the test studies. The rod end 25 moves an ion wash 18 toward and away from the main flow of gases 15 if the ablation rate is not constant. The wash 18 or wake of ionized gases is produced by the meeting of a cool inert gas 12, such as argon or nitrogen near room temperature, with the hot ionized gases 15. The cool gas 12 is normally adjusted to flow gently through annulus 17 at a rate which will maintain the gaseous wash 18 slightly outside the edge of the flame shield.

FIG. 2 shows an experimental test appartus for detecting ion current flow with a detecting probe 19 inserted in annulus 17 near the flame shield edge 20. The small diameter wire electrode 19 is at positive potential with respect to the flame shield 13 and with respect to the flame gases 15 that flow over it. Battery 22 connected to the electrode 19 at the end 21 provides the potential difference which causes a small current flow from ions collected on electrode 19. A high-impedance vacuum tube voltmeter is used to measure the voltage due to ion current flow through resistor 24.

FIG. 3A and 3B show two embodiments for detecting a boundary region created in the ion wash 18 where the hot and cool gas flow meet in the annulus 17. In FIG. 3A an electrode 19 is used to sense distributed surfaces 30 of constant ion density, where ions drift to electrode 19 when it is placed close to the surfaces. As the cool gas flow is decreased the surfaces 30 of constant ion density will be pushed farther into annulus 17 such that the surfaces become progressively less dense, that is $I_3 > I_2 > I_1$. In FIG. 3B the steep temperature gradient in the area 31 is used for the detection of the boundary region between the hot and cool gases. The distribution of surfaces of constant ion density I and the surfaces of constant temperature T in the temperature gradient closely resemble one another. For detecting the thermal gradient, a tube 26 containing leads 28 supported by material 29 and having a thermocouple bead 27 at the end is inserted in the annulus 17 near the thermal gradient. In both embodiments, when the boundaries 30 or 31 move with respect to the electrode 19 or the thermocouple bead 27 a change in boundary position is detected.

Referring to FIG. 4, a rod 11 of material to be tested is shown surrounded by a ring-shaped cylindrical electrode 33. Both the rod 11 and electrode 33 are positioned in the annulus 17 in flame shield 13 so that rod 11 is movable with respect to both the flame shield and the electrode 33. Cool gas 12 is applied along rod 11 through the annular spaces 34 and 17 and is adjusted to establish a stable boundary region identifying the sharp transitions of temperature and ion density with respect to the flame gases 15. Electrode 33 is fixed near the edge 20 in the annular space 17 in close proximity to the temperature and ion density gradients. As the cylindrical rod 11 moves toward the hot gases 15, the end of the rod 25 ablates and is consumed in the flame. If the end of the rod 25 ablates back closer to opening 17, the edge of the region of ion availability or the ion wash 18 moves back also, closer to the electrode 33, causing the ion current to increase. If the end of the rod moves more into the flame, the opposite happens, that is, the ion wash 18 moves away from the electrode and the ion current decreases. Since the region of ion availability or wash 18 occupies a stable position with respect to the end of the rod 25, the changes in ion current can be used as a signal to keep the ion current constant and therefore to keep the ablating end of the rod in a constant position with respect to the flame shield 13.

The automatic control system in FIG. 5 illustrates how the described detection method and apparatus are used in controlling the movement of a test material while measuring the rate of movement. A cool gas source 35 and a flame gas 14 are applied along the specimen holder 36 and establish stable boundary regions of ionization near the end of ion probe 19. Changes in ablation rate produce changes in ion current flow in lead 37 which are detected by signal voltage divider comprising resistors 38, 41, ion probe bias 39, and capacitor 40. Increases in ion current in lead 43 are compared with the reference circuit, resistor 44 and battery 45, and amplified by servo amplifier 47. The amplified signal is fed to servo motor 48, which works worm gear 49 which operates the variable gear reduction unit 50. Reduction unit 50 operates cable sheave 51 and steel cable 52 moves the specimen holder 36 toward or away from the flame 14 by way of connection 53. If holder 36 is moving too rapidly into the flame, the ion current decreases and the servo system moves the holder 36 back from the flame, but if holder 36 is moving too slowly into the flame, the ion current increases and the servo system operates in the opposite manner. Position recorder 60 records the position of the specimen holder in response to signals on lead 57. The circuit comprising potentiometer 56, and battery 55 provide the source for electrically signalling the mechanical change in postion. The position change of the holder 36 over a time period provides a direct measurement of the ablation rate of the end of the material being studied.

It should now be apparent that the described method and apparatus provide a more dependable way of detecting ablative rates of materials moving into a hot gaseous environment where viewing conditions of the material being studied is poor. With this invention it is now possible to eliminate manual control errors and control the rate of the ablating material automatically so as to counterbalance the rate of ablation and provide a more accurate measurement of ablation rates for materials being tested.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. In a system for detecting changes in position of a stable boundary region formed by the meeting of an inert gas and an ionized gas comprising
   a flame shield for deflecting a flame gas having a flat face with a small annular space therethrough;
   a flame source for supplying a hot ionized gas to said face;
   a cool gas source for supplying a cool gas through said space and forming a stable boundary region at the edge of said face; and
   means for detecting changes in the position of said boundary with respect to the edge of said flame shield.

2. In a system for controlling the position of ablating materials in hot flowing fluids comprising:
   a rod having at least one end composed of material capable of ablating,
   a hot fluid source for supplying hot flowing fluid to one end thereof, causing said one end to ablate,
   a cool fluid source for supplying a cool, gently flowing fluid around and along the length of said rod such that a stable boundary region is formed at the ablating end thereof,
   means positioned near the said ablating end for detecting changes in said boundary positions with respect to said detecting means and,
   control means connected between the other end of said rod and said detecting means for controlling the position of said rod whereby said rod moves toward the hot fluid at a gradual and continuous rate.

3. The system of claim 2 wherein said stable boundary region is a region of constant ion density and said detecting means is a thin wire ion sensing electrode.

4. The system of claim 2 wherein said stable boundary region is a region defined by a steep thermal gradient and said detecting means is a thermocouple.

5. The system of claim 2 further comprising means for recording the rod position in response to rod movements.

6. In a measuring and testing system for detecting changes in the ablation rate of consumable materials in hot flowing fluids comprising;
   a rod having at least one end composed of material capable of ablating at high temperatures,
   a hot gas applied to one end of said material causing it to ablate at a certain rate,
   a cool gas applied along the length of the rod forming a stable boundary surface with respect to the hot gas at the ablating end thereof, and
   means for detecting changes in position of said boundary surface with respect to said detecting means.

7. The system of claim 6 wherein said detecting means is an ion sensing electrode and said boundary surface is a constant ion density gradient.

8. The system of claim 6 wherein said detecting means is a thermocouple and said boundary surface is defined by a steep thermal gradient.

9. In a measuring and testing apparatus for detecting, controlling and measuring the ablation rate of consumable materials in hot flowing gases comprising:
   a hot flame gas source for supplying hot ionized gases to a mass of consumable material to cause said material to ablate, a water cooled flame shield for deflecting said gases;
a rod of said material inserted through an annular space in said flame shield such that only one end of the rod extends into said hot gases,
a source of inert gas for supplying a cool, gently flowing gas through the annular space along the length of the rod between the rod and the flame shield such that the cool gas and the hot ionized gases form a stable boundary surface of constant ion density wherein there is a sharp transition from a low ion density region to a high ion density region,
an ion sensing electrode inserted in said annular space near the ablating end of the rod for sensing changes in ion density as said boundary surface moves with respect to said electrode,
means connected to said electrode for detecting changes in ion current,
a servo system connected to said detecting means and responsive to changes in ion current on said electrode for controlling the movement of the rod toward said hot gases, and
mechanical means connected to said servo system for moving said rod toward said hot gases responsive to decrease in ion current and for moving said rod away from said hot gases responsive to an increase in ion current,
whereby said rod is moved gradually and continuously toward the hot gases at a rate equal to the rate of ablation of the consumable material.

10. The system of claim 9 further comprising means for recording the position of the rod in response to said additional means moving said rod.

References Cited by the Examiner
UNITED STATES PATENTS

| | | | |
|---|---|---|---|
| 2,603,085 | 7/1952 | Cannon | 73—26 |
| 2,820,945 | 1/1958 | Marsden | 324—33 |
| 3,247,714 | 4/1966 | Schwabe et al. | 73—359 |

JAMES J. GILL, *Acting Primary Examiner.*

J. J. SMITH, *Assistant Examiner.*